March 8, 1960

H. H. TURNER 2,927,483

POSITIONING MECHANISM

Filed Nov. 24, 1958

INVENTOR
Harold H. Turner
By Carlsen, Pitzner, Hubbard & Wolfe
ATTORNEY

INVENTOR
Harold H. Turner
By Carlsen, Pitzner, Hubbard & Wolfe
ATTORNEY

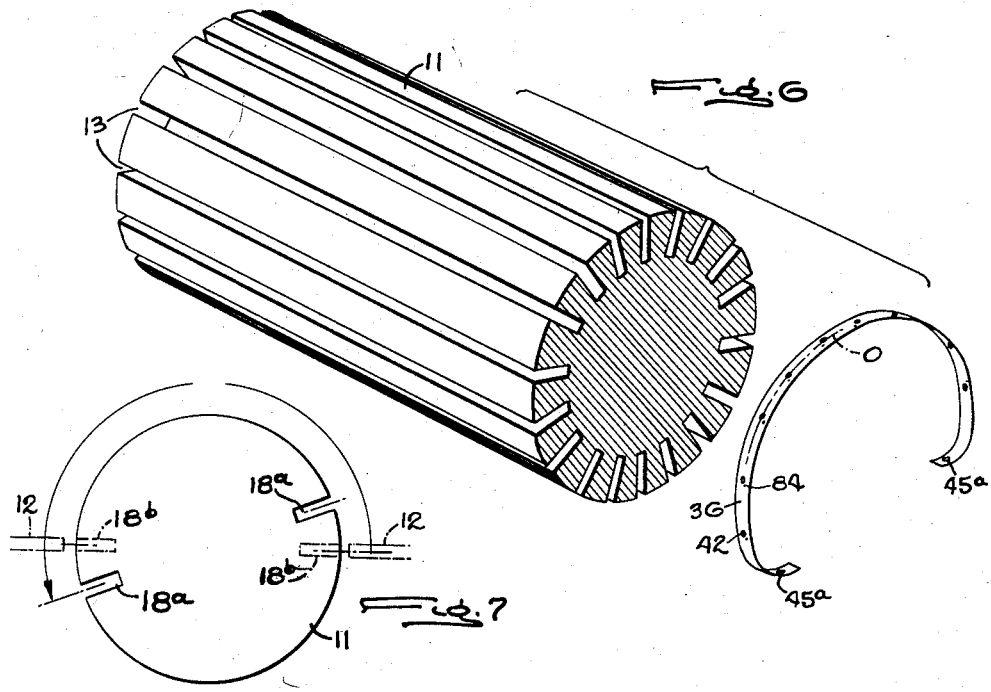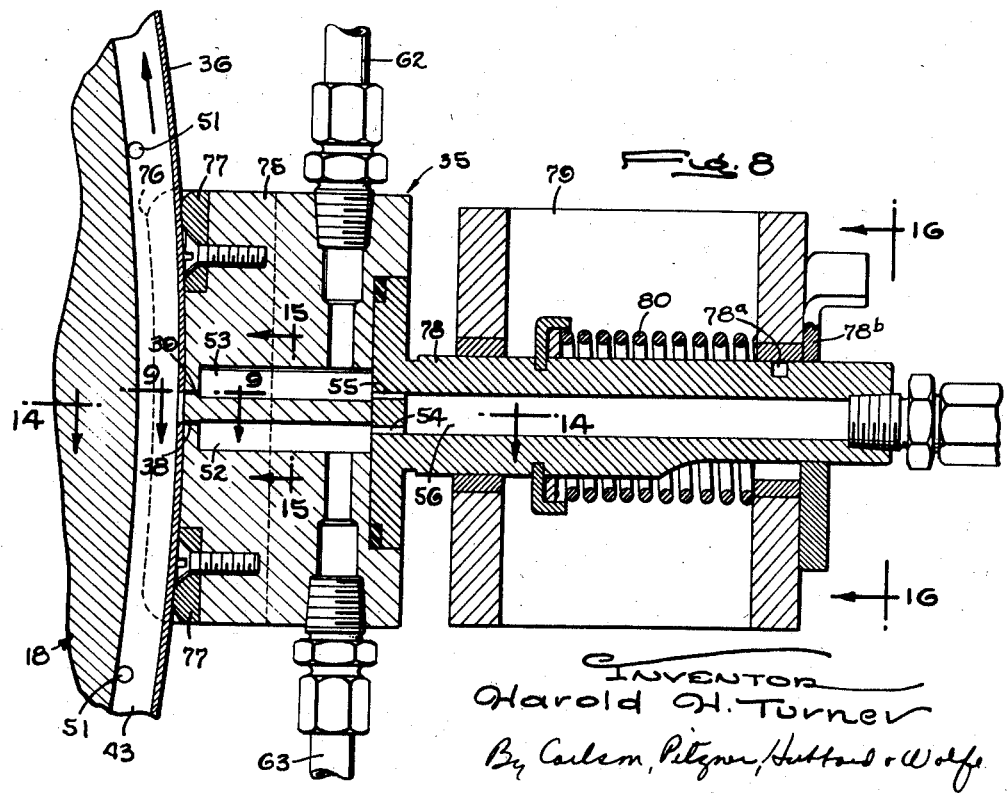

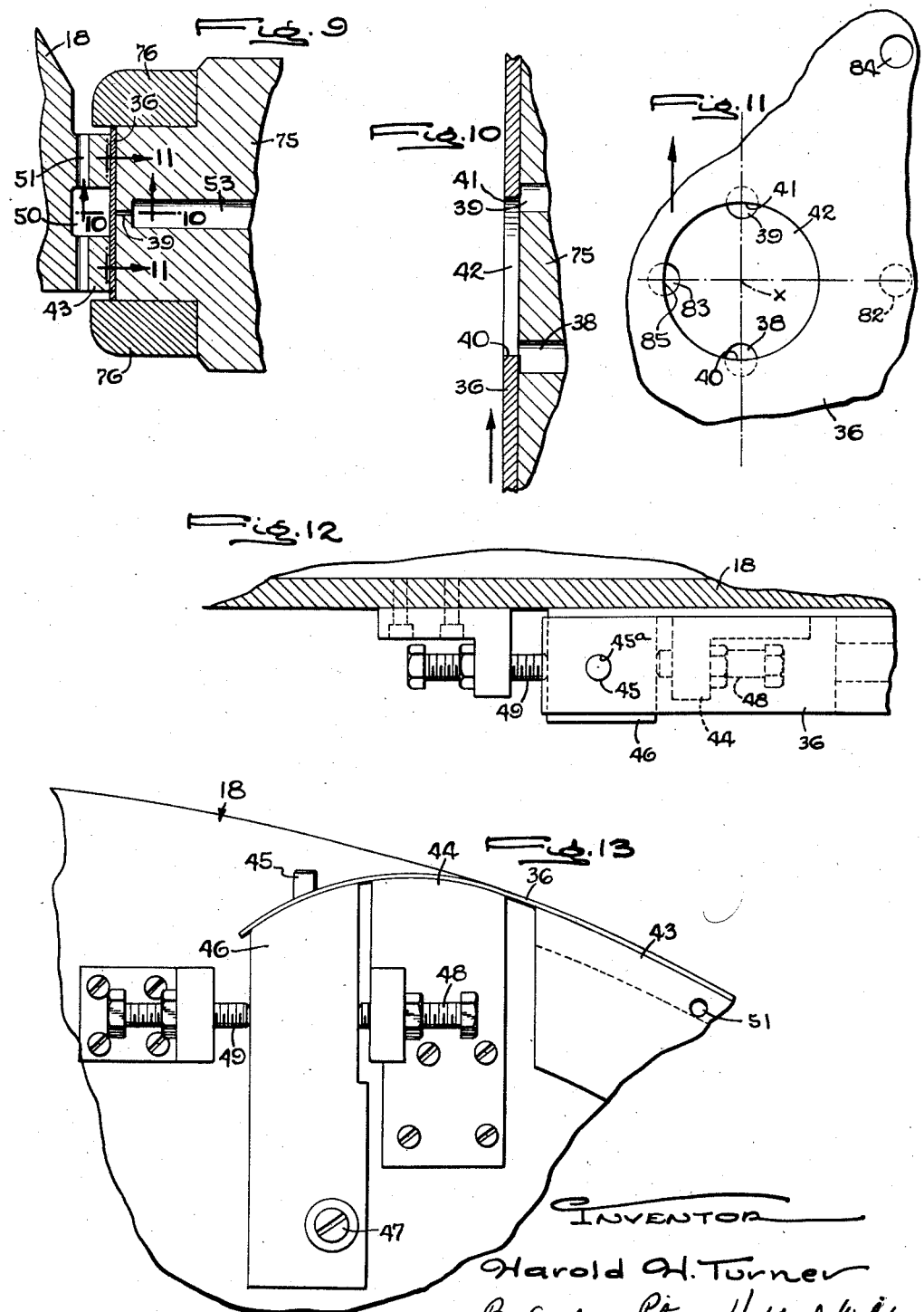

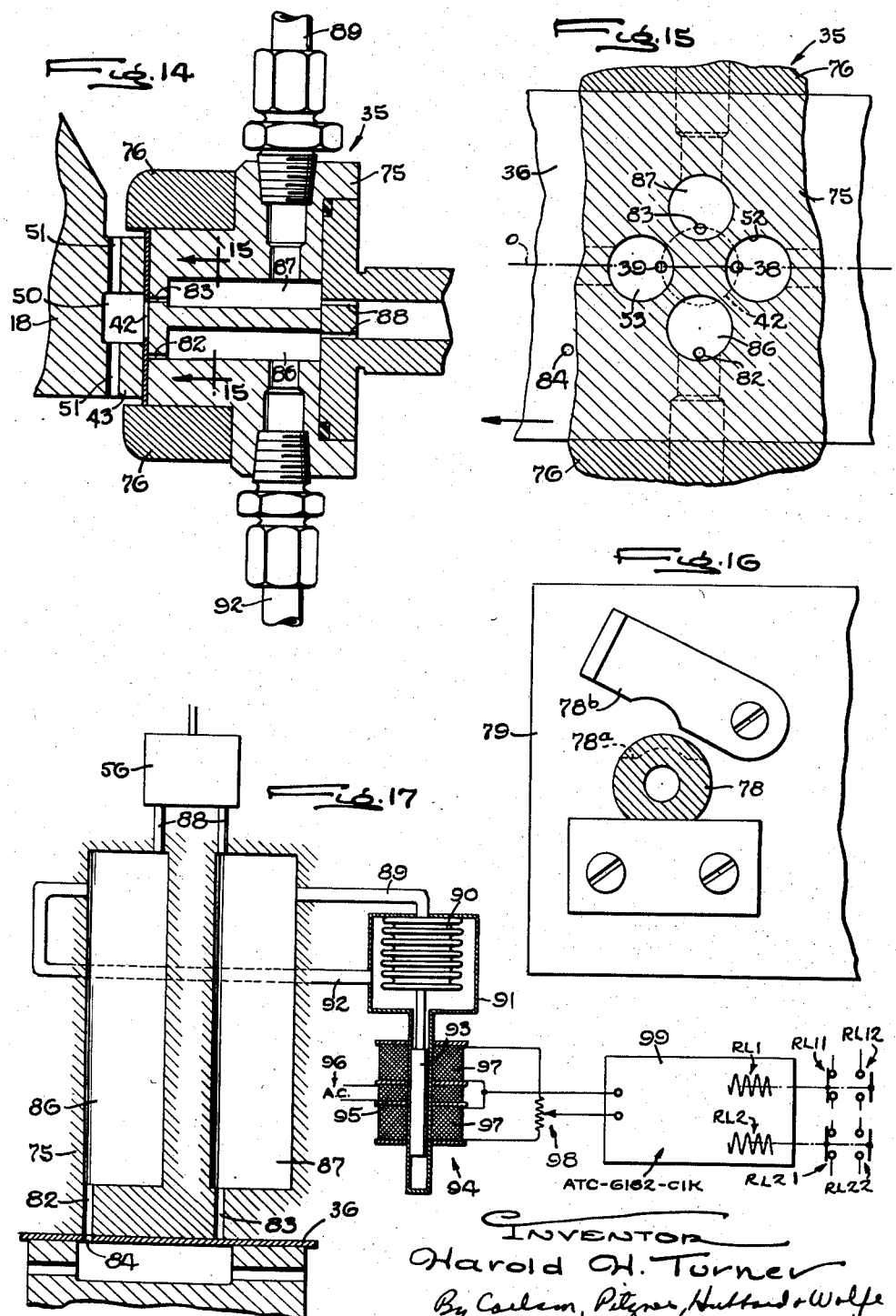

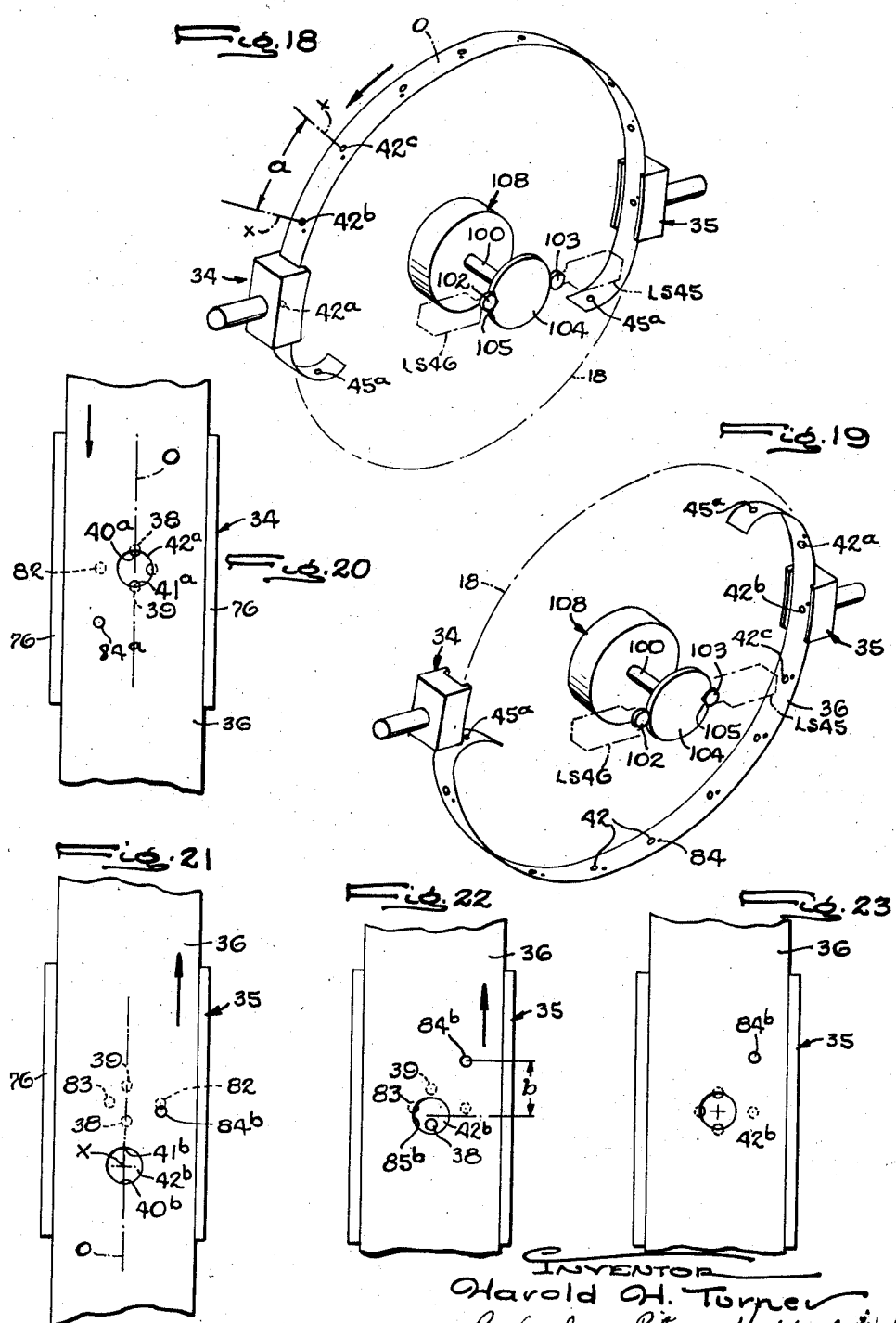

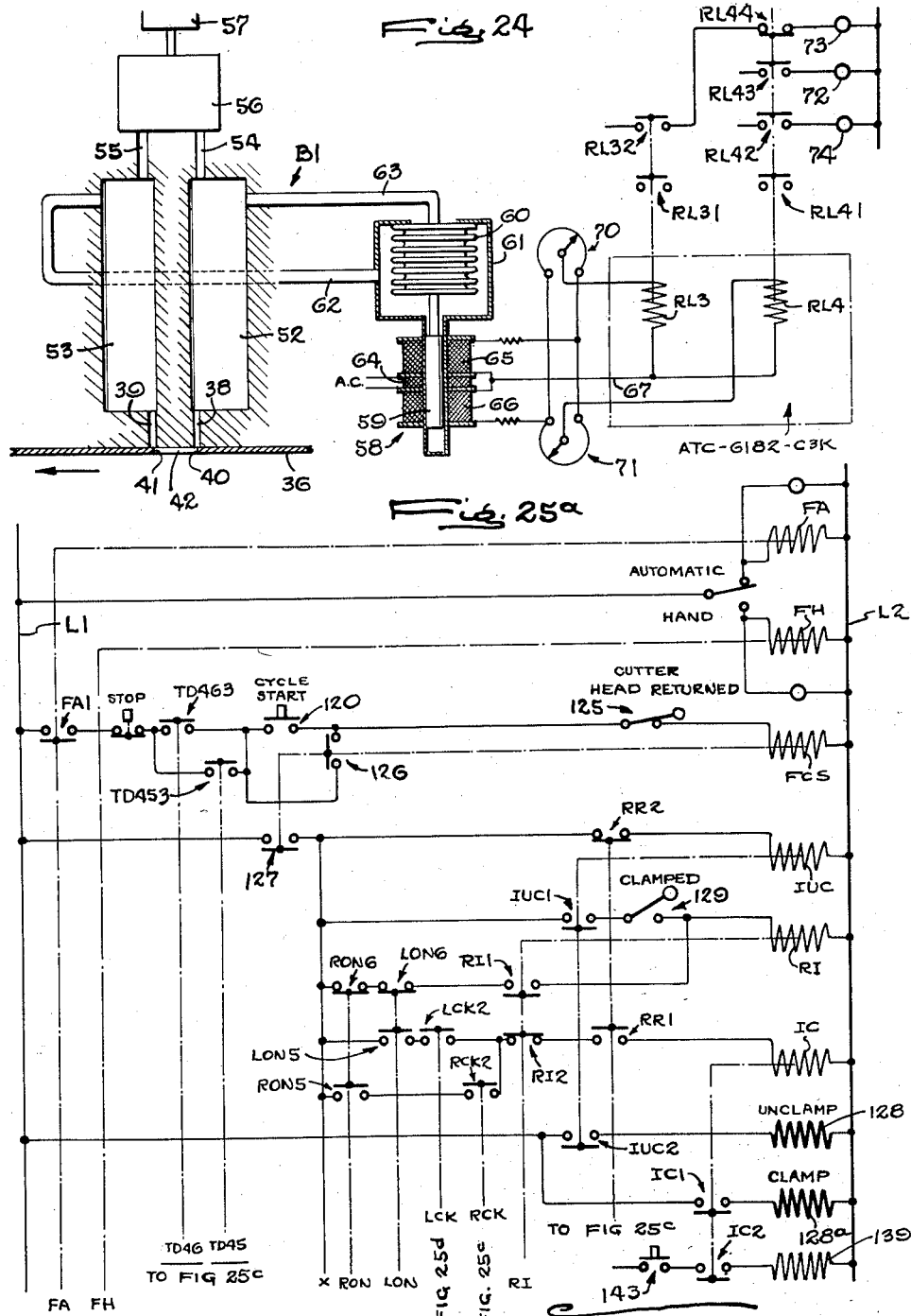

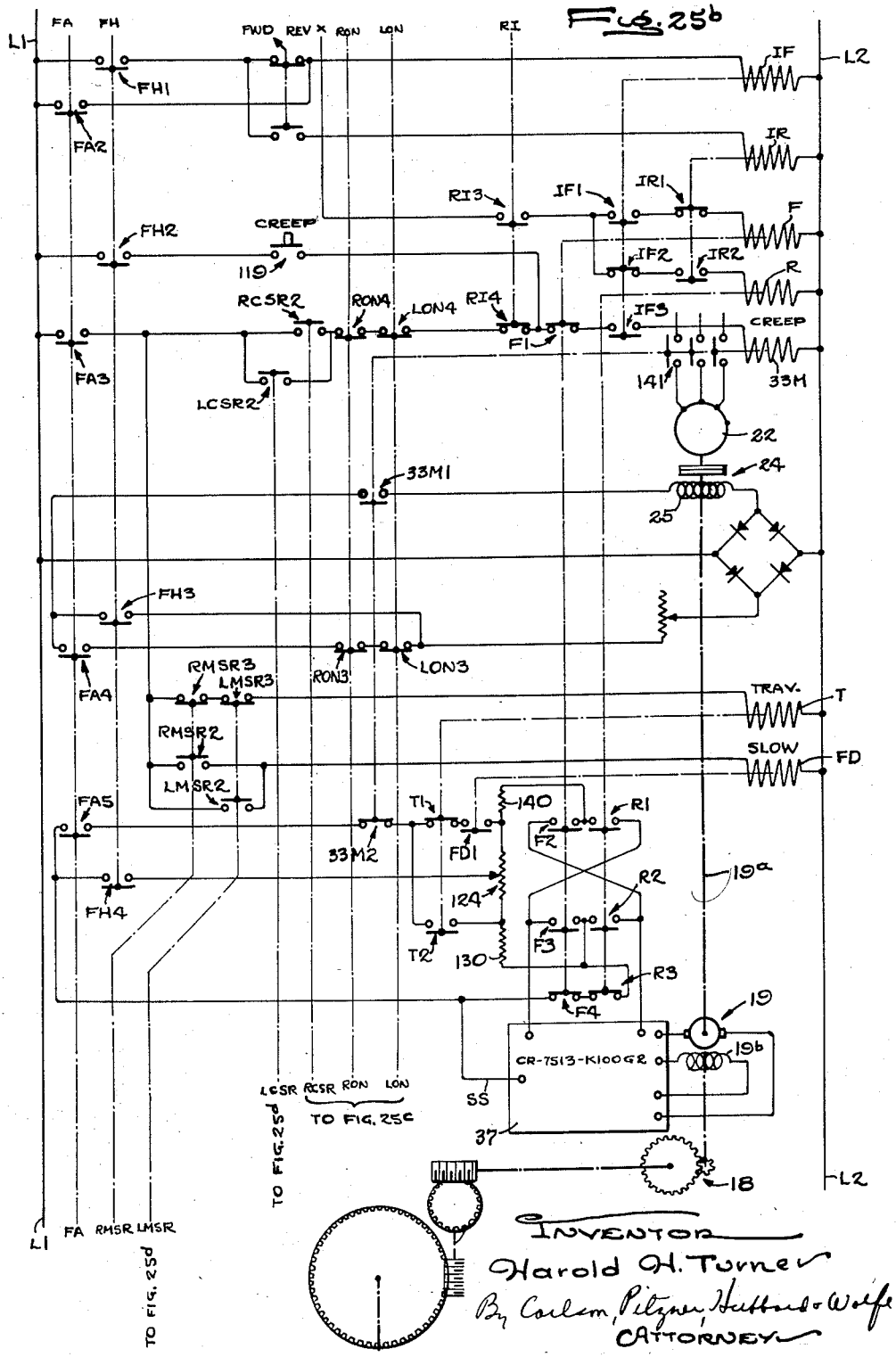

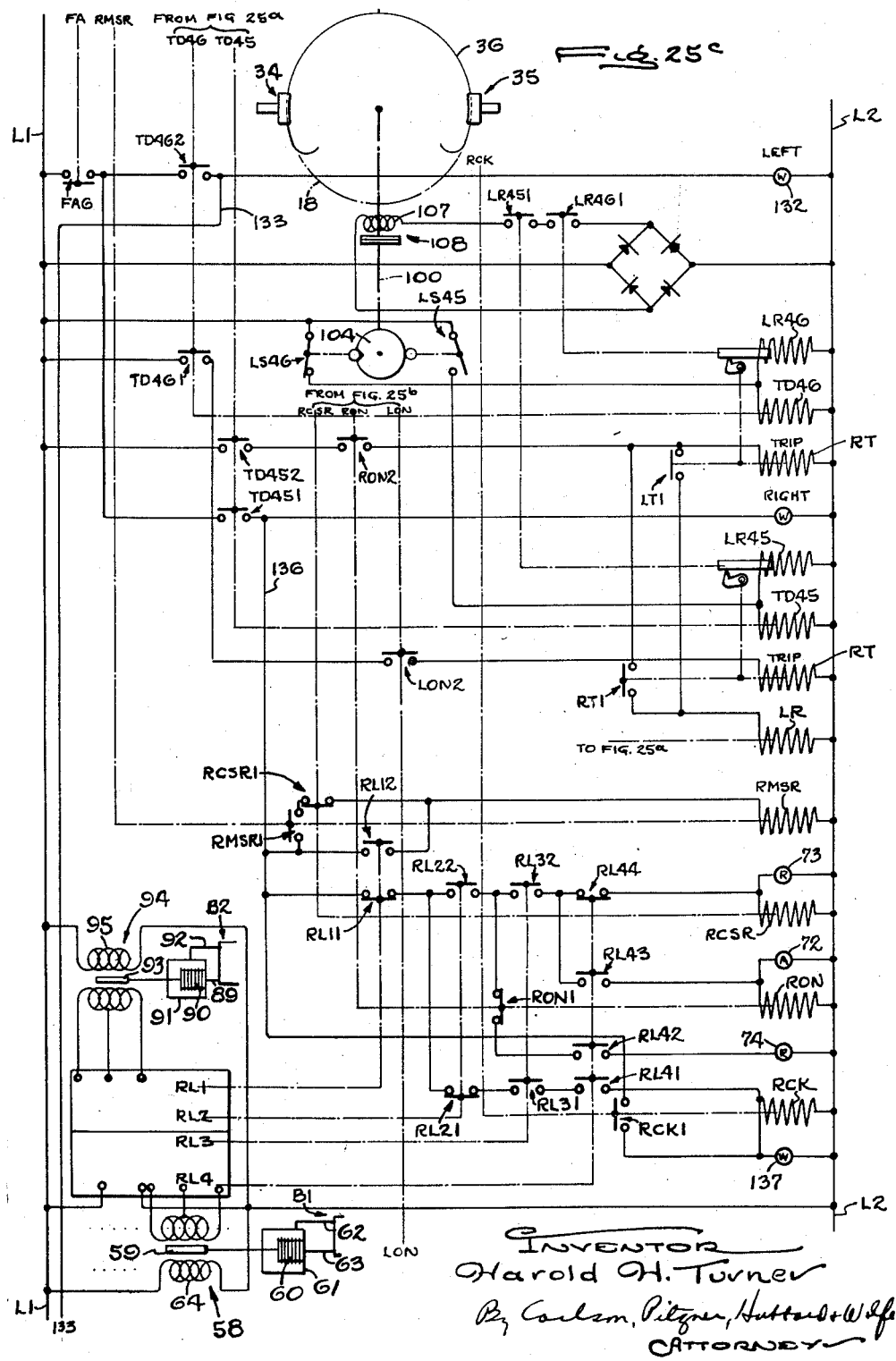

March 8, 1960 H. H. TURNER 2,927,483
POSITIONING MECHANISM
Filed Nov. 24, 1958 12 Sheets-Sheet 12
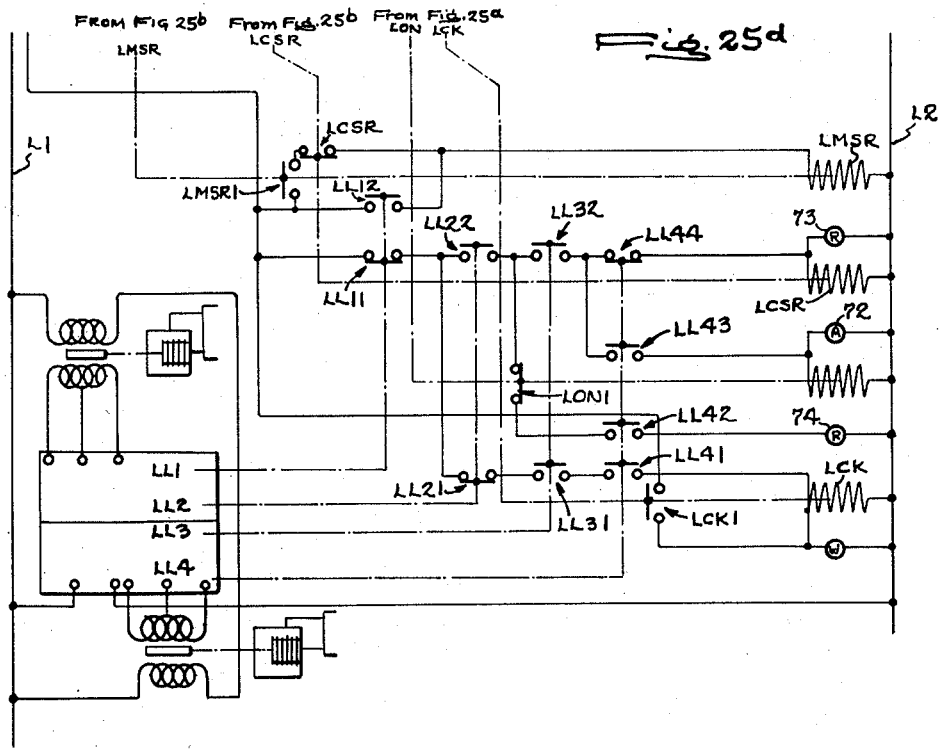
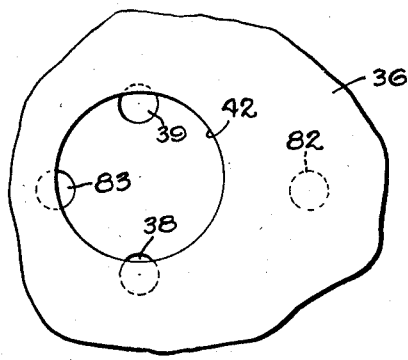
INVENTOR
Harold H. Turner
By Carlsen, Pitzner, Hubbard & Wolfe
ATTORNEY United States Patent Office 2,927,483
Patented Mar. 8, 1960

2,927,483

POSITIONING MECHANISM

Harold H. Turner, Rockford, Ill., assignor to The Ingersoll Milling Machine Company, Rockford, Ill., a corporation of Illinois Application November 24, 1958, Serial No. 776,029

13 Claims. (Cl. 74—821)

This invention relates to a power actuated mechanism for enabling an object to be moved or indexed to any selected one of a plurality of precisely located positions spaced along a predetermined path, the arrival of the object in a selected position being determined by a pneumatically controlled sensing device coacting with apertures spaced along a member extending along said path.

One object is to effect precise and automatic stopping of the object in a selected position by providing a multiple speed operator and utilizing apertures in the control member in a novel manner to reduce the speed of the operator as the object approaches the selected position.

Another object is to disable the power operator in the event that the positioning is not effected with predetermined precision.

A further object is to utilize a single pneumatic bridge network to control several parts of the indexing cycle.

Still another object is to transfer the control of the positioning operator from one pneumatically actuated sensing head to the other to insure greater accuracy in establishing a plurality of different positions.

Another object is to provide for automatically checking the pneumatic and electric circuits during each indexing motion and indicate the detection of a defective circuit.

Other objects and advantages of the invention will become apparent from the following detailed description taken in connection with the accompanying drawing, in which—

Fig. 6 is a perspective view of a workpiece illustrating the manner of its association with the perforated control member.

Fig. 7 is an end view of a partially machined workpiece.

Fig. 8 is a fragmentary section taken along the line 8—8 of Fig. 1.

Fig. 9 is a fragmentary sectional view taken along the line 9—9 of Fig. 8.

Figure 1:
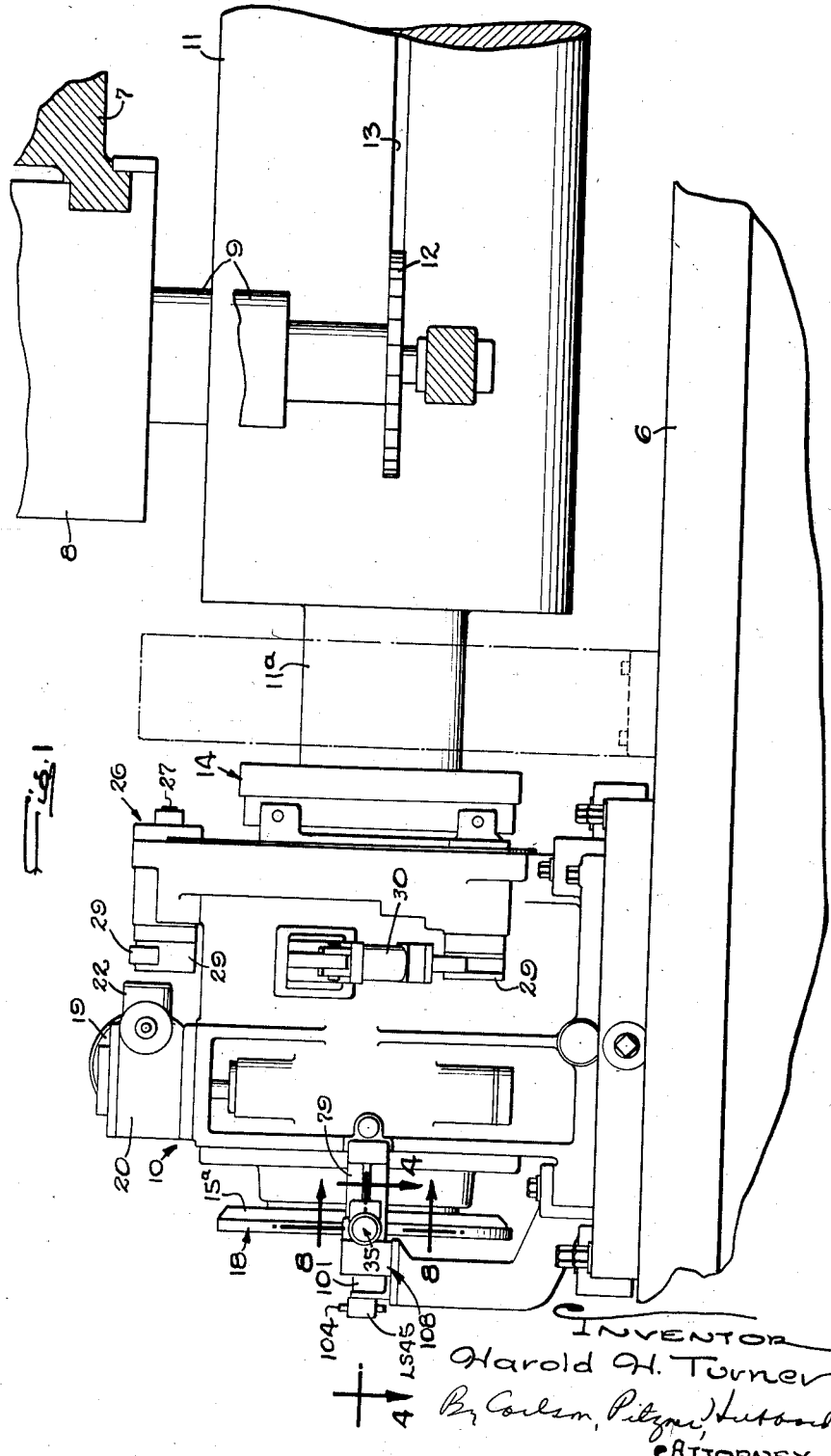
Figure 1 is a fragmentary elevational view of a machine tool equipped with a power actuated positioning mechanism embodying the novel features of the present invention.

Figs. 10 and 11 are fragmentary sections taken along the lines 10—10 and 11—11 of Fig. 9.

Fig. 12 is a fragmentary plan view of one of the tape tensioning devices.

Fig. 13 is an elevational view of the tensioning device shown in Fig. 11.

Fig. 14 is a fragmentary sectional view taken along the line 14—14 of Fig. 8.

Fig. 15 is a section taken along the line 15—15 of Fig. 14.

Fig. 16 is a fragmentary sectional view taken along the line 16—16 of Fig. 8.

Fig. 17 is a fragmentary diagrammatic sectional view of one of the pneumatic bridges.

Figs. 18 and 19 are perspective views of the sensing devices and control tape in different control positions of the latter.

Figs. 20 to 23 are diagrammatic views showing different positions of the control tape and sensing orifices in the course of locating the moving object in a selected position.

Fig. 24 is a schematic view similar to Fig. 17 showing another one of the pneumatic bridges.

Figs. 25$^a$ to 25$^d$ when arranged one below the next are a schematic view and wiring diagram of the indexing actuator and its controls.

Fig. 26 is an enlarged view similar to Fig. 23 showing another position of the tape.

While the invention is susceptible of various modifications and alternative constructions, I have shown in the drawings and will herein describe in detail the preferred embodiment and a typical mode of its operation. It is to be understood, however that I do not intend to limit the invention by such disclosure, but aim to cover all modifications and alternative constructions falling within the spirit and scope of the invention as expressed in the appended claims.

For purposes of illustration, the invention is shown in the drawings incorporated in a machine for indexing a support 10 for a cylindrical workpiece 11 to accurately define angular positions so as to present different peripheral portions of the workpiece to one or more rotary milling cutters 12 by which uniformly or non-uniformly spaced longitudinal slots 13 (Fig. 6) are cut in the piece. The cutters are fast on spindles 9 mounted in heads 8 on a rail or other support 7 for movement of the cutters radially into and out of engagement with the work, relative longitudinal movement between the cutters and the work being effected by feeding of the table 6 on which the work supports 10 are mounted. These movements of the tool head and table are produced by electric motor or other power actuators controllable through appropriate circuits as is well understood in the art.

Figure 3:
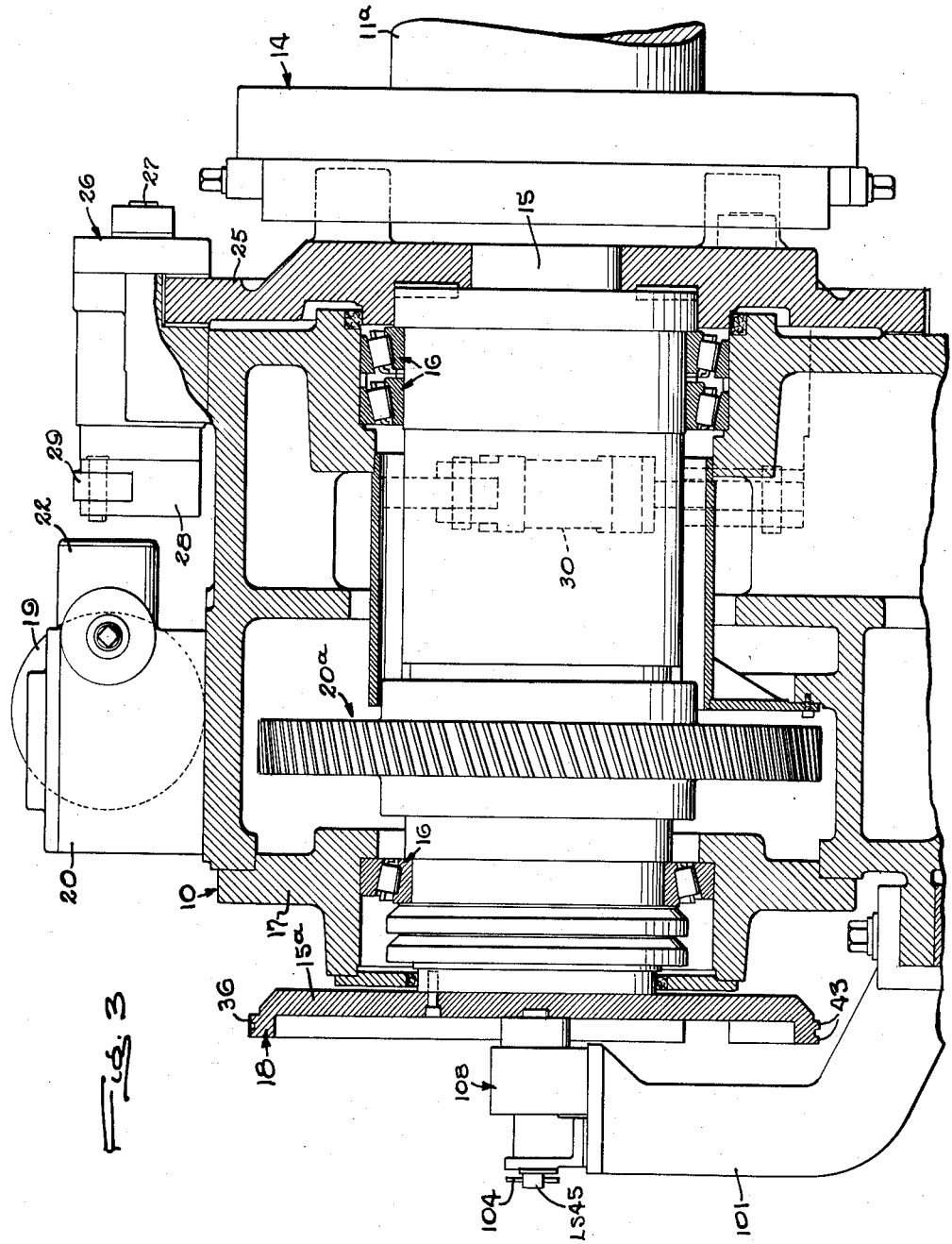
Fig. 3 is a longitudinal section taken along the line 3—3 of Fig. 2.

Trunnions 11$^a$ at opposite ends of the workpiece are coupled by chucks 14 to the ends of alined shafts 15 journaled intermediate their ends in bearings 16 on the machine frame 17. The improved indexing mechanism is mounted at the other end of one of the shafts 15 and includes a disk 15$^a$ screwed to the shaft end (Fig. 3) and having a drum 18 formed around its periphery concentric with the shaft axis.

A suitable power operator is provided for indexing the workpiece and drum at a plurality of different speeds correlated with the mass of the moving parts so that the latter can be moved relatively rapidly toward a selected position, slowed down as it approaches such position, and further slowed down to a so-called creep speed as the work comes close to the final stopping position. For use with heavy rotor castings as shown weighing more than 100,000 pounds, high and low approach speeds of one third r.p.m. and 1/500 r.p.m., and a creep speed of 1/600 r.p.m. have been found to be satisfactory.

In the present instance, the several speeds are produced by electric motor operators including a reversible motor 19 coupled through suitable speed reduction gearing 20 (Fig. 25$^b$) to a worm wheel 20$^a$ fast on the shaft 15. Selective energization of the motor to determine its direction and the high and low approach speeds is controlled by a suitable amplifier unit 37, for example, an electronic amplifier and relay sold by General Electric Company and known as CR–7513–K100G2.

Figure 5:
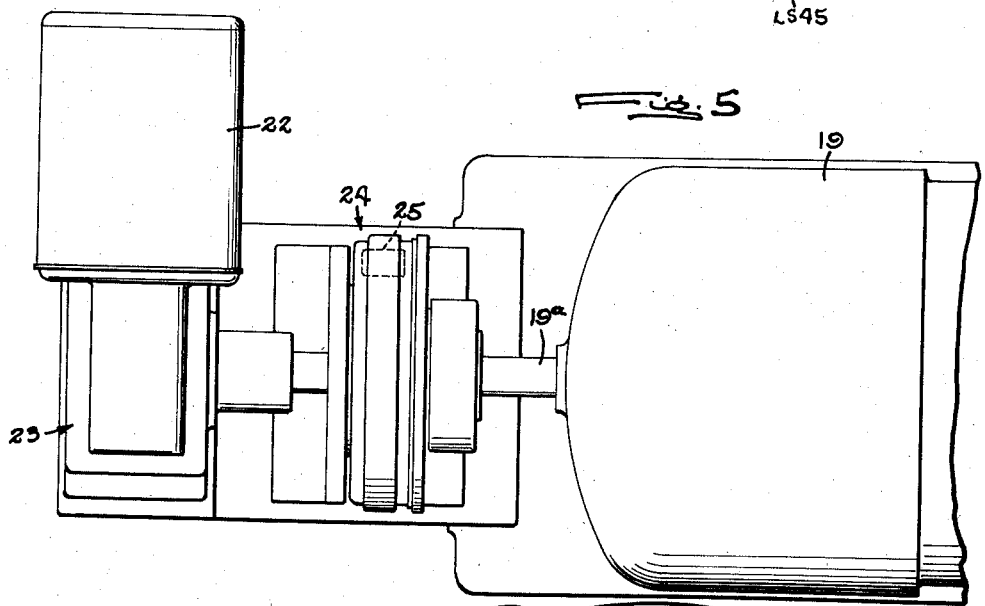
Fig. 5 is a plan view of the drive motors.

Final accurate positioning of the workpiece at a so-called creep speed is accomplished by an alternating current motor 22 (Figs. 1, 5 and 25$^b$) coupled to the shaft 19$^a$ of the motor 19 through speed reducing gearing 23 and a magnetic friction clutch 24 which is engaged when its winding 25 is energized. This motor is of the unidirectional type and arranged to turn the drum 18 counterclockwise as viewed in Figs. 2, 18 and 19.

Suitable power actuated clamps hold the workpiece and the drum against turning during cutting of the slots 13. For this purpose, a disk 25 (Fig. 3) fast on the shaft 15 is pressed against the machine frame by clamps 26 actuated by screws 27 carrying cranks 28 which are connected to the piston rods 29 of hydraulic actuators 30. The latter are fulcrumed on the machine frame and adapted through suitable solenoid actuated valves to be energized and deenergized at proper times to apply and release the clamps.

The motors 19 and 22 may be controlled manually to stop the workpiece precisely in a selected position or they may, after selection of the next workpiece position, be energized and deenergized selectively and automatically to execute an automatic cycle comprising rapid approaching of the workpiece to within a predetermined distance of the selected position, continuing the feed at the slow rate during a further approach, creeping of the workpiece at the very low speed to the selected position, and finally automatically deenergizing the creep motor 22 to stop the work upon its arrival precisely in such position.

In accordance with the present invention, the different parts of this automatic cycle are terminated by signals derived from the motion of the workpiece and measured at the surface of the drum 18 by pneumatic sensing devices 34 and 35 (Figs. 2, 8, 18, 19, 24) coacting with indicia carried by the drum and arranged in groups spaced around the drum in accordance with the spacing of the work slots 13 of the positions to which the work is to be indexed. Herein, the indicia comprise apertures or the edges of apertures or recesses formed in a tape 36 stretched around the surface of the drum 18.

The signal for indicating the presence of the workpiece precisely in a selected position is produced in the active sensing device 34 or 35 by a pneumatic bridge network B1 having orifices 38 and 39 coacting with pairs of edges 40 and 41 facing toward each other and longitudinally of the tape, the several pairs being spaced along a path $o$ (Figs. 6, 18 and 19) paralleling the indexing motion of the workpiece with the centers $x$ between the edges of successive pairs separated by distances $a$ and corresponding to selectable positions of the workpiece. While the edges 40 and 41 may be raised above the tape or defined by separate holes, they comprise in the present instance the diametrically opposite arcuate portions of holes 42 centered at the points $x$. The spacing of these points may be uniform or non-uniform depending on positions of the slots 13 to be formed in the workpiece.

Preferably the tape 36 is composed of hardened steel and is about .010 of an inch thick. While the holes may take various shapes such as notches along the tape margins, they are in the present instance circular holes, usually about ¼ of an inch in diameter, disposed between the edges of the tape with their centers spaced along the common centerline $o$ of the tape.

Preferably, the sensing devices 34 and 35 are mounted stationarily on the machine frame and the tape is stretched over the periphery of the drum 18 and extended along an arc concentric with the axis around which the work is indexed. Herein the tape straddles and is laid around the outer surfaces of ribs 43 (Figs. 3, 9, 12 and 14) spaced apart axially along the drum. Beyond the ends of the ribs, the end portions of the tape are bent around the arcuate outer surfaces of blocks 44 (Fig. 13) and formed with holes 45ª hooked over pins 45 projecting from the outer ends of blocks 46 pivoted at 47 on the drum 18.

The blocks 44 are bolted to the drum and carry screws 48 which together with screws 49 may be adjusted to swing the intervening block 46 and thus vary the tension under which the tape is held around the arcuate ribs 43.

The latter define a central channel 50 covered by the tape 36 and communicating with the holes 42 therein and with outwardly opening passages 51 extending through the ribs.

The orifices 38 and 39, which are .040 of an inch in diameter in the present instance, are spaced apart a distance equal to the diameter of the holes 42 in the tape. That is to say, the centers of these orifices are ¼ of an inch apart so that when the centers of the respective orifices coincide with the edges 40 and 41 of any hole 42, equal areas of the orifices will be uncovered as shown in Figs. 8, 10, 11, 23 and 24.

The orifices 38 and 39 constitute two legs of the pneumatic bridge network B1 and communicate with chambers 52 and 53 respectively connected to restrictions 54 and 55 (herein .025 of an inch in diameter) which constitute the other two legs of the bridge across which pneumatic pressure is applied by connection of these orifices to a chamber 56 supplied with air under a constant regulated pressure, for example 15 p.s.i., from a source such as a reservoir 57 (Fig. 24). With this arrangement, the escape of pressure fluid from the chambers 52, 53 and therefore the pressure drop across the other two corners of the bridge will be determined by the extent of relative overlapping of the orifices 38 and 39 by the edges 40 and 41 of the tape holes. That is to say, when both orifices are covered by the solid area of the tape or are uncovered to the same degree, the pressures in the chambers 52, 53 will be balanced. At other times, when only one orifice is uncovered or the two orifices are uncovered different amounts, the bridge will be unbalanced correspondingly as evidenced by a corresponding pressure difference between the chambers 52, 53.

Such unbalance and the degree thereof may be measured accurately by a well known auto-transformer or an electromagnetic transducer 58 having an armature 59 coupled to the adjacent free ends of a bellows 60 enclosed in a sealed casing 61 communicating through a pipe 62 with the respective chamber 53. A pipe 63 connects the chamber 52 with the interior of the bellows. An alternating voltage is impressed across the input coil 64 while the common terminal of the output coils 65, 66 is connected to the common terminal 67 of two relays RL3 and RL4 (Fig. 24) which may be of the type sold by Automatic Timing and Control Company by the number ATC–6182–C3K and may include suitable amplifiers where high sensitivity is desired. The other terminals of these relays are connected to the sliders of two potentiometers 70 and 71 connected across the other terminals of the coils 65 and 66 as shown in Fig. 24. By adjusting the sliders, the electrical network thus formed may be conditioned for energizing both of the relays RL3 and RL4 when the pneumatic bridge is balanced by equal uncovering of the orifices 38 and 39 as shown in Figs. 10, 20, 23 and 24. This condition is indicated by lighting of a lamp 72 by the switch RL43. In the present instance, the adjustment is such that the deenergization of the relay RL3 requires a greater degree of unbalance than RL4. For the same reason, the relay RL3 alone will be energized when the uncovering of the port 38 predominates, that is, just before the pneumatic bridge B1 becomes balanced. This is indicated by lighting of a lamp 73 by closure of the relay switch RL32. Similarly, when the workpiece and the tape overrun the balanced position as shown in Fig. 26, a larger part of the orifice 39 will be uncovered and the relay RL4 will be energized, the relay RL3 being deenergized. This is indicated by the lamp 74 energized by the relay switch RL42.

Figure 2:
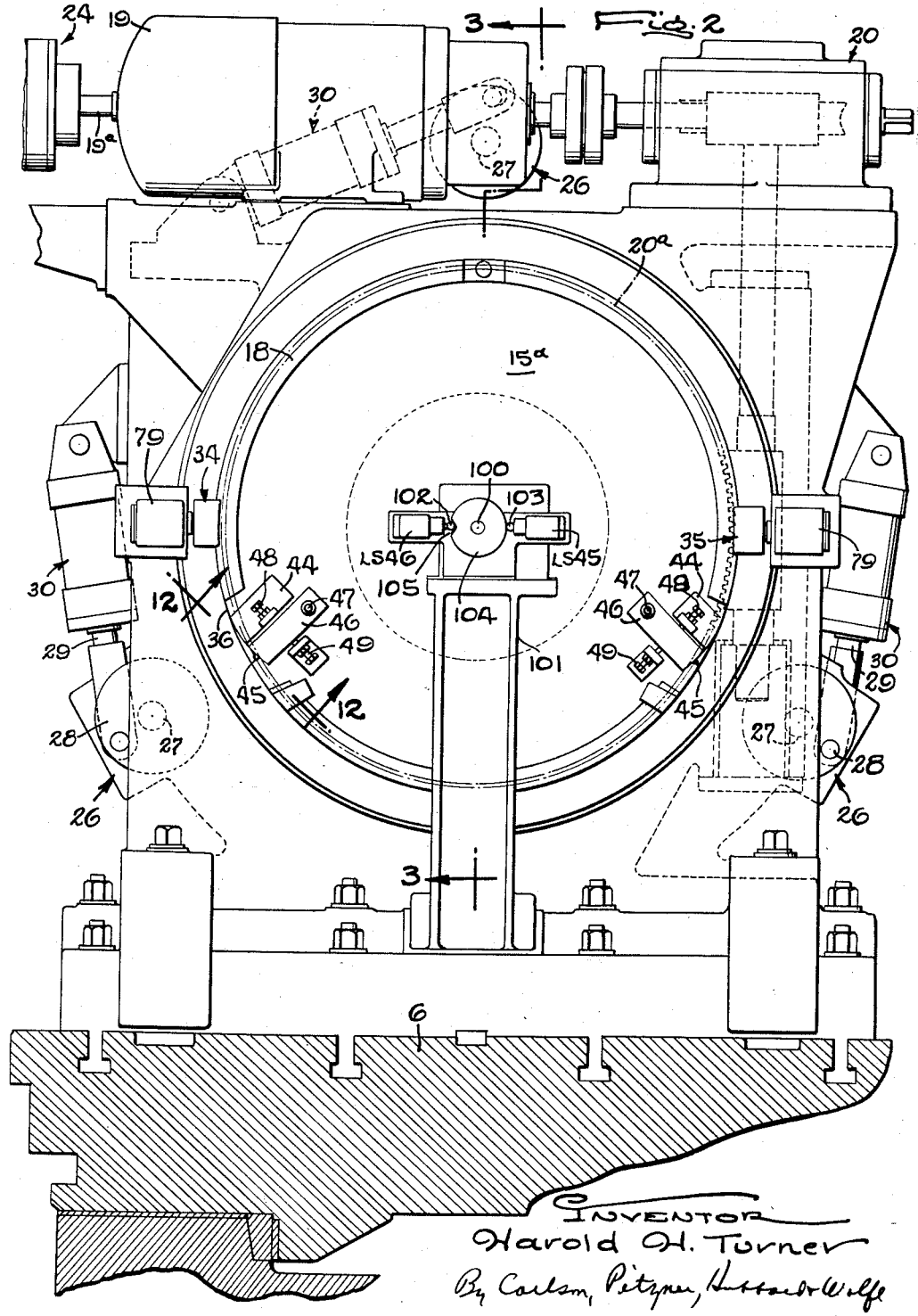
Fig. 2 is a fragmentary end view.

The orifices 38 and 39 of the sensing device 35 are formed in a head 75 (Figs. 8, 9 and 14) having flanges 76 which define a channel whose bottom wall is defined in part by nylon wear plates 77. A tubular extension 78 of the head houses the chamber 56 and is slidable in a bracket 79 projecting from the machine frame as shown in Fig. 2. A spring 80 coiled about the extension urges the head 75 toward the tape 36 thus seating the latter in the bottom of the head channel and against or at least closely adjacent the orifices 38 and 39. Thus, pressure fluid may escape freely through one of the orifices only when a portion thereof is uncovered, both orifices being covered when a solid area of the tape is presented to them as shown in Figs. 9 and 21.

The other pneumatic sensing device or left hand head 34 is of the same construction as the right hand head 35 just described except that the positions of the parts 38 and 39 are reversed because the selected hole 42 in the tape travels in a downward direction (Figs. 18 and 20) in approaching the sensing device 34. This is contrasted with upward movement of the selected hole 42 when the sensing device 35 is in control of the creep motor 22 (see Figs. 19 and 21).

The two heads are disposed on diametrically opposite sides of the drums 18 and precisely located with the centers between the two pairs of orifices 38 and 39 angularly spaced apart a known distance, 180 degrees in this instance. This corresponds to the spacing of the terminal holes 42 at opposite ends of the tape.

The measuring mechanism above described operates with great accuracy because the tape is conditioned in a novel manner such that the spacing of the holes 42 remains precisely fixed in spite of wide variations in ambient temperature which occur in service use and which would be expected to produce expansion or contraction of the tape and thus alter the spacing of the holes. To avoid this, the holes 42 are formed while the tape is held in a stretched condition and thus elongated by an amount greater than the expansion which would result from the temperature changes to which the tape is subjected in service. The tape thus prepared is mounted in the measuring mechanism under the same degree of stretch thus restoring the desired precise spacing of the holes. Such stretching is effected by adjusting the screws 48 and 49 after the tape has been laid around the ribs 43 of the drum and coupled to the pins 45. In this stretched condition, the only effect of ambient temperature changes will be to change the tension within the tape, there being no elongation or contraction at any time during service use of the mechanism. This method of perforating and conditioning the tape forms the subject matter of my copending application Serial No. 682,529, filed September 6, 1957.

During mounting of the tape on the drum or in changing to a tape having differently spaced holes, the sensing heads 34 and 35 are held in retracted positions. This is accomplished by forming the mounting tube 78 (see Figs. 8 and 16) of each head with a notch 78ª which, when the tube is retracted, is adapted to receive a latch 78ᵇ pivoted on the bracket 79.

The signal for terminating the high speed part of the work indexing cycle by continuing the operation of the motor 19 at a reduced slow speed is derived in the present instance by a second similar pneumatic bridge network B2 shown in Figs. 14, 15 and 17 and having orifices 82 and 83 terminating at the face of the block 75 and spaced apart transversely of the tape 36 midway between the orifices 40 and 41. The orifices 82, 83 communicate with chambers 86, 87 which lead to the other legs of the pneumatic bridge formed by restrictions 88 similar to the restrictions 54, 55 of the main senser B1 and communicating with the compressed air reservoir 56. The chamber 87 is connected through a passage 89 to the interior of a bellows 90 enclosed within a sealed casing 91 which communicates through a passage 92 with the chamber 86. The free end of the bellows carries the armature 93 of a transducer 94 whose input coil 95 is energized through a suitable alternating current source 96. The output coils 97 are shunted by an adjustable potentiometer 98 and connected through suitable phase sensitive relays RL1 and RL2 respectively responsive to different phases of unbalance of the pneumatic bridge. Suitable for this purpose are relays known as ATC-6182-C1K which include suitable amplifiers. When the bridge is unbalanced by uncovering of the orifice 84, the relay RL1 is energized. Unbalancing the bridge by uncovering the orifice 83 results in the energization of the relay RL2 whose switch RL22 is included in the circuit of the lamp 73. The energization of this relay stops the motor 19 and starts the motor 22 for continuing the short remaining part of the indexing motion at the creep speed.

The orifice 82 is adapted for registration with holes 84 similar in size to this orifice and formed in the tape 36 along a path offset laterally from the path o and outwardly to one side of the holes 42. As shown in Figs. 11, 21 and 22, the holes 84 are spaced ahead of the holes 42 a distance b equal to the desired combined length of the slow feed and creep portions of each indexing motion. Thus, when a hole 84 comes into registry with the orifice 82 as shown in Fig. 21, the pressure inside the casing 91 is reduced thereby expanding the bellows, whereupon the transducer armature is shifted off center to effect energization of the relay RL1. This results in a slow speed signal being fed to the amplifier 37 which reduces the speed of the motor 19, preferably about half an inch short of the final stop position of the workpiece.

The creep portion of the index cycle is relatively short being on the order of .030 of an inch in the present instance. This motion is initiated by stopping the motor 19 at its slow speed and initiating operation of the motor 22. The creeping speed determined by the reduction gearing driven by the motor 22 will vary with the mass of the workpiece and the connected parts. It should be sufficiently slow to insure stopping of the work precisely in the desired position following energization of the relays RL3 and RL4 as above described by balancing of the pneumatic bridge B1 in response to equal uncovering of the orifices 38 and 39 by the edges 41 and 40 as shown in Fig. 23. With the workpiece and speed mentioned above, it has been found that the work will, after deenergization of the motor 22, come to a complete stop with a coast of no more than .001 of an inch following response of the relays to the tape position shown in Fig. 23. Moreover, such slight coasting is very uniform in the successive indexing motions so that in spite of the large mass being moved, extreme accuracy is achieved in the positioning of the work at the different selected points.

While the shift to the creep speed can be accomplished by providing separate holes in the tape as in the shift from rapid to slow feed, it is preferred to use the edge portions of the holes 42 defined by the arcs 85 of these edges. Thus, the orifice 83 is disposed transversely of the tape in a position to be uncovered by the edge 85 to the proper degree as shown in Fig. 22 just before the workpiece reaches the desired stopping position. The bridge circuit thus becomes unbalanced sufficiently to energize the relay RL2 and effect deenergization of the motor 19 and energization of the motor 22. The point in the indexing motion at which the relay becomes energized may be varied to some extent by adjustment of the potentiometer 98 (Fig. 17).

In another of its aspects, the invention contemplates the use of the right and left heads 34 and 35 at different times, alternately in this instance, for controlling the different or successive indexing motions. This mode of operation is advantageous in enabling the adjacent slots 13 to be more precisely spaced around the work by avoiding an accumulation of the slight errors that might result from using a single sensing head to terminate the successive indexing motions. In this way, a more perfect balance is achieved in the finished workpiece.

To the foregoing end, provision is made for using the head 34 coacting with one hole 42 (for example 42ª Fig. 18) to determine one indexed position and the head 35 coacting with the next hole 42, for example 42ᵇ, to determine the succeeding position of the work. This involves indexing the drum and tape unidirectionally, counter-clockwise as viewed in Figs. 18 and 19, after each indexing step and through a half revolution plus an angle equal to the spacing *a* of the adjacent holes 42ᵃ and 42ᵇ on the tape. During such turning of the drum, the sensing heads 34 and 35 are both disabled for somewhat more than a half revolution of the work so that the previously used hole 42ᵃ will pass by the sensing head next to be used. The latter head is then activated for response to the next group of tape holes in the continued turning of the drum.

Referring to Figs. 2, 3, 18, 19 and 25ᶜ, the disabling of the heads 34 and 35 is effected by opening switches LS45 and LS46 mounted on the machine frame diametrically on opposite sides of a shaft 100 journaled on a bracket 101 to turn about the axis of the drum 18. The radially slidable followers 102 and 103 of the switches ride the surface of an open face cam 104 having a notch 105 for receiving one of the followers to permit closing of the associated switch.

With the cam in the position shown in Fig. 18, the switch LS46 is closed and the sensing head 34 is in control of the indexing actuator, the head 35 being disabled by virtue of the opening of the switch LS45. Upon turning of the cam counterclockwise, the switch LS46 is closed immediately and both switches remain closed until the drum has completed a half revolution. Then, the follower 103 drops into the cam notch closing the switch LS45. The head 35 may then be used in controlling the termination of the next indexing cycle.

Figure 4:
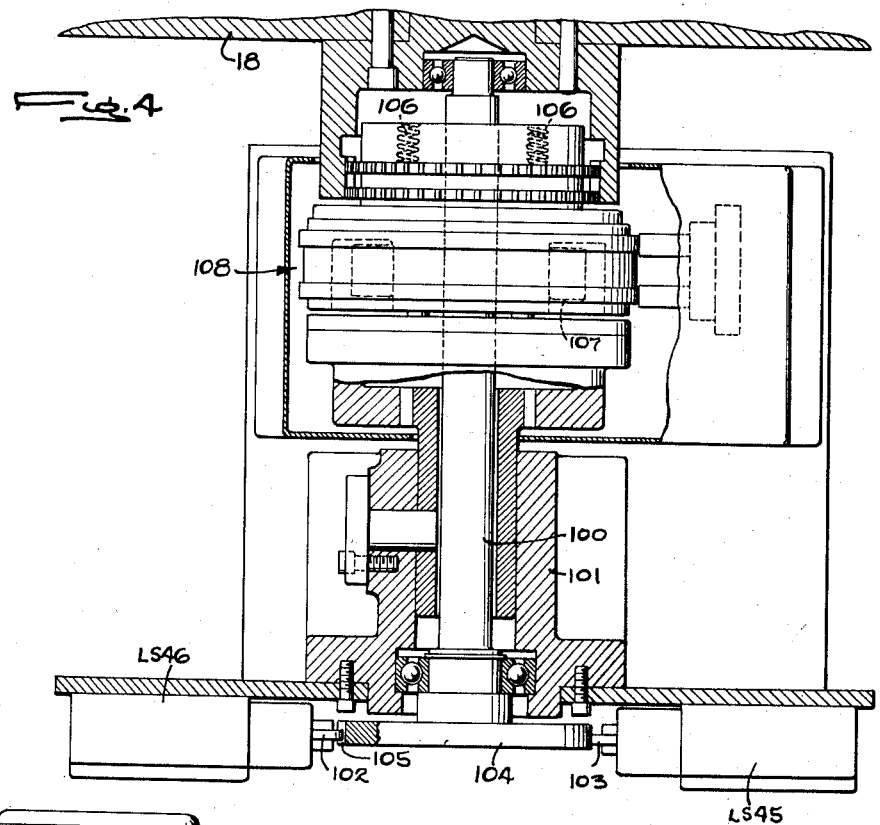
Fig. 4 is a fragmentary sectional view taken along the line 4—4 of Fig. 1.

To avoid the necessity of resetting the cam in each indexing cycle, it is coupled to the drum 18 and turns therewith through only a half revolution, the added motion of the tape required for carrying the previously used tape hole 42 out of range of the sensing head next to be used being continued by other means later to be described. Herein, the cam coupling is effected by a friction clutch 108 (Fig. 4) (Stearns No. 402-4) which is engaged by the force of springs 105 and disengaged by energization of the clutch winding 107 which also engages a friction brake associated with the clutch. This type of clutch permits the cam 104 to be turned independently of the drum and brought to the proper position in initially setting up the machine.

Operation

The combined circuit shown in Figs. 25ᵃ to 25ᵈ and the various components illustrated are typical of those which may be employed in automatically controlling the termination of successive indexing cycles as contemplated by the present invention. For the sake of simplicity, various interlocks and overload and safety devices that would be employed in normal service use have been omitted, and certain of the illustrated components such as the relay holding circuits will not be described in detail. For convenient checking, the reference numbers for most of the relays and associated switches are the same as those used on the manufacturer's working drawings for the machine illustrated. Also, the relays and other parts associated with the left and right sensing heads 34 and 35 are designated by the letters L and R in their reference numerals. The power supply conductors for the various circuits are indicated by L1 and L2.

The indexing cycles may if desired be executed under manual control by observing the signal lamps 73 and 74 and by proper manipulation of the start switch 120, a manual switch 122 for controlling the operation of the motor 19 in either direction and a switch 119 for starting and stopping the creep motor 22. Ordinarily however these switches are used only for a preliminary positioning of the parts preparatory to manual starting of successive indexing cycles which are terminated automatically under the control of the groups of tape holes, the feeler heads 34 and 35 and the relays responsive thereto.

In conditioning the apparatus for automatic operation, a selector switch 121 is first set in the manual position thus energizing a relay FH to close a switch FH1 and place the motor 19 in control of a selector switch 122 and at a speed determined by the setting of a potentiometer 124. A switch 123 for operating the creep motor 22 is also rendered operative by closure of the switch FH2.

By such operation, the tape 36 may be advanced to bring the group of holes next to be used in controlling the motors 19 and 22 closely adjacent the sensing head 34. For automatic operation to complete such motion, switch 121 is moved to the automatic position as shown in Fig. 25ᵃ thereby disabling the manually controlled switches used in the setting up operation. Also, preparatory to such automatic operation, the cam 104 should be in the position shown in Fig. 18 with the follower 102 in the notch 105. By slipping the clutch 108, the cam may be turned manually to this position.

Let it now be assumed that the circuits have operated automatically under the control of the tape hole 42ᵃ and the sensing head 34 thus stopping the drum and the workpiece as shown in Fig. 18 with the work precisely located for cutting the first two slots. As will appear later, the clamps 26 become applied in the final part of the indexing cycle after which the operator initiates the advance of the cutter heads by the switch 143 (Fig. 25ᵃ) to bring the cutters into engagement with the workpiece and feed the same along the latter to cut the first two slots 18ᵃ (Fig. 7) on diametrically opposite sides of the workpiece. Upon retraction of the cutter heads under manual control, switches, one of which is indicated at 125, will be closed thus conditioning the relay FCS (Fig. 25ᵃ) for energization in response to closure of the start switch 120. This relay is sealed by closure of the switch 126 and closure of the relay switch 127 completes the circuit for the relay IUC whose switch IUC2 is closed to energize the solenoid 128 for deenergizing the actuators 30 for the various work clamps 26. Such unclamping closes limit switches 129, one of which is shown, to energize the relay RI. Closure of the switch RI3 (Fig. 25ᵇ) completes the circuit for the relay through the then closed switch 127. Energization of this relay closes switches F2 and F3 which complete the circuit through the armature of the motor 19 for starting the latter. Simultaneous opening of the switch F4 applies to the amplifier 37 an input voltage or so-called speed signal for causing the motor field 19ᵇ to be energized properly for running the motor at the desired speed determined by a resistor 130 which is then connected to the speed signal line SS by closure of the switch T2 of the relay T then energized as a result of the previous conditioning of the circuits for automatic operation.

With the motor 19 thus started, the drum 18 starts to turn counter-clockwise (Figs. 2 and 18) thus advancing the tape 36 past the head 34. At this time, the winding 107 of the clutch 108 (Fig. 25ᶜ) is deenergized because of the open condition of the switch LR451 of the then unlatched relay LR45. The clutch is thus engaged by its springs 106 (Fig. 4) thereby coupling the cam 104 to the drum 18. In the initial turning of the cam, the follower 102 rides out of the notch 105 thus opening the LS46. This deenergizes the winding of the time delay relay TD45 and also the relay LR46 which remains latched with its switch LR461 closed. The resulting opening of the switch TD462 deenergizes the lamp 132 which indicates to the operator that the left hand sensing head 34 is disabled. This same switch interrupts a circuit through a conductor 133 connected to the group of relays 134 used in conjunction with the sensing head 34, the latter thus being disabled.

Deenergization of the relay TD46 by opening of the cam actuated switch LS46 opens the switch TD463 (Fig. 25ᵃ) thus interrupting the circuit through the cycle start switch 120 and the relay FCS. This prevents any premature starting of another cycle until the drum has turned through the half revolution preparatory to associating the tape hole 42ᵇ with the sensing head 35 for controlling the termination of the indexing motion.

The turning of the drum continues until a full half revolution is completed when the follower 103 drops into the cam notch 105 allowing the switch LS45 to close. This energizes the relay LR45 (Fig. 25c) which becomes latched and the time delay relay TD45 is also energized. Closure of the switch LR451 completes a circuit through the then latched in switch LR461 to energize the winding 107 and thus release the clutch and set the associated brake. The cam 104 is thus uncoupled from the rotating drum 18 and locked in the position shown in Fig. 10.

The relay TD45 is of well known construction and is timed for about six seconds during which the group of relays 135 of the sensing head 35 are held disabled by the then open switch TD451 in the supply conductor 136 for these relays. The right sensing head 35 is thus held disabled long enough to permit the previously used hole 42$^a$ of the tape to turn through more than a half revolution and thereby pass by the orifices 38, 39 of this head. These relays 135 are conditioned for operation when the switch TD451 closes, which occurs during the approach of the hole 42$^b$, by which the indexing is to be terminated to sensing head 135.

At this time, all of the orifices 38, 39, 82 and 83 of the senser 35 are covered by the tape and both of the pneumatic bridges will be balanced. If these bridges and the electric circuits and the relays RL1 to 4 controlled thereby are operating properly, all four of the relay switches RL11, RL21, RL31, and RL41 will be closed completing a circuit for lighting a white signal lamp 137. This indicates to the machine operator that the relay RL1 is deenergized and the relays RL2, 3 and 4 are energized and therefore that the positioning system is prepared to respond properly to the changes in the bridges to be produced by the tape holes. Closure of this same circuit also energizes the relay RCK which seals itself through its switch RCK1 and closes a switch RCK2 which sets up a circuit for permitting energization of the relay IC which later initiates application of the clamps 26 and conditions the circuit for permitting operation of the cutter heads.

During the time that all of the orifices of the head 35 are covered by the tape, either of the pneumatic bridges or some part of the electric circuits may be defective. For example, foreign matter from the compressed air supply may partially block one of the restrictions 54, 55 and 88 of the pneumatic bridges or a leak may have developed in the passages 62, 63, 89, 92 in which case the bridges B1 and B2 will be unbalanced and the associated relays improperly conditioned. Or a broken electrical circuit connection or a burned out vacuum tube therein would similarly result in one of the switches RL11 to RL41 (Fig. 25c) being open. As a result of any one of these possible failures, the lamp 137 will not be lighted by virtue of such switch opening and the relay RCK will fail to energize. The switches RCK1 and 2 of the latter remain open and thus maintain disabled the circuit for the relay IC which controls the circuit for the clamping solenoid 138 through its switch IC1 and also the switch IC2 which controls the circuit for the relay 139 that governs the operation of the cutter head.

It will be observed that such checking of both the pneumatic and electrical circuits always occurs at a time in the indexing cycle when a blank area of the tape 36 is disposed opposite and therefore covering all four of the orifices 38, 39, 82 and 83 of the particular sensing head 34 or 35 which is to control the next indexing cycle, such blank area of the tape being that immediately in advance of the group of holes (42$^b$, 84$^b$ and 85$^b$) next to be presented to the active sensing head. While such selection of this particular blank area may be effected in various ways, it is achieved in the present instance by the cam 104 coacting with the time delay relay TD45. These operate in the manner above described to hold the select sensing head, the right head 35 in this instance disabled until a time during turning of the drum 18 just before the bridge and electrical circuits are to be brought into play in terminating the current indexing motion.

As a result of such accurate checking, any existing defect will be detected and subsequent malfunctioning of the positioning mechanism and operation of the cutters on the improperly positioned workpiece will be prevented. This avoids the danger of improperly machining a costly workpiece.

Let it be assumed that the bridge and electric circuits are found to be working properly, the tape drum continues to turn at high speed by operation of the motor 19 in spite of the fact that the bridge B1 is balanced which is the same condition of this bridge which controls the eventual stopping of the motor operator. This is because the bridge B2 is also balanced at this time due to covering of its orifices 82, 83 by a blank area of the tape. As a result of the deenergization of the relay RL1, the relays RCSR and 33M are deenergized thus maintaining the motor 19 energized. When, in the continued advance of the workpiece and the tape, the hole 84$^b$ reaches and partially uncovers the orifice 82 as shown in Fig. 21, the balance of the pneumatic bridge B2 (Fig. 17) will be upset in a direction to expand the bellows 90 and cause the relay RL1 to be energized opening the checking switch RL11 above described and closing the switch RL12. The latter completes a circuit for the relay RMSR which seals itsely and opens a switch RMSR3 deenergizing the high speed relay 31T and closing a switch RMSR2 which energizes the slow feed relay 31FD. As a result, a proper voltage signal derived from the speed control resistor 140 is fed to the amplifier 37. The resulting change in the output causes the speed of the motor 19 to be reduced so that the advance of the tape continues at slow speed.

As the hole 84$^b$ passes over and beyond the orifice 82, the bridge B2 becomes rebalanced but the relay RMSR remains energized through its holding circuit. The indexing motion thus continues at the slow rate and the leading hole edge 41$^b$ passes over the orifice 38. While this causes the pneumatic bridge B1 to be unbalanced and the associated relay RL4 to be deenergized, the operation of the motor 19 is unaffected.

When the tape has advanced far enough for the edge portion 85$^b$ of the hole 42$^b$ to partially uncover the orifice 83 as shown in Fig. 22, the bridge B2 is unbalanced in the reverse direction contracting the bellows 90. Through the transducer 94, this causes the relay RL2 to be energized. Closure of the switch RL22 of this relay completes the circuit for the relay RCSR which closes its switch RC3R2 to complete a circuit for energizing the relay 33M. Opening of the switch 33M2 of this relay deenergizes the motor 19 through the amplifier 37.

The simultaneous closure of the switches 141 of the relay 33M starts the creep motor 22. Switch 33M1 is closed to complete the circuit for energizing the winding 25 of the clutch 24 thus coupling the motor 22 to the shaft 19$^a$ of the motor 19. The rotor of the latter thus continues to turn under the power supplied by the creep motor as the lattern continues the advance of the tape drum and workpiece at the extremely low creep speed. At this same time, the red lamp 73 is lighted by closure of the relay switch RL32 thus indicating to the operator that the tape drum is closely approaching its final position at the slow creep speed.

During the continued creeping of the tape drum through the short range, usually about .030 of an inch, the uncovering of the orifice 39 by the leading edge of the hole 42$^b$ causes the unbalance of the bridge B1 to decrease progressively thereby lowering of the transducer armature 59. At the position of substantially equal uncovering of the orifices 38, 39 by the tape hole 42$^b$ as shown in Fig. 23, the bridge B1 will be balanced and the relay RL4 will be energized at a time determined by the adjustment of the potentiometer 71. At this condition of balance, the relay RL3 remains energized.

Since at this balance point of the bridge B1, the bridge B2 is unbalanced because its orifice 83 is partially uncovered, the switch RL11 of the relay RL1 will be closed and this, together with the closure of the switch RL43 and the then closed switches RL22 and RL32, completes the circuits for energizing the amber signal lamp 72 and the relay RON. The circuit for the coil 25 of the clutch 24 is broken by opening of the switch RON3 and opening the switch RON4 deenergizes the relay 33M thereby interrupting the circuit for the creep motor 22. In view of the extremely low creeping speed, the workpiece and the tape normally come to a stop immediately and without moving the tape hole 42$^b$ far enough to materially upset the balance of the bridge B1.

Simultaneous closure of the switch RON5 further prepares a circuit for the relay IC partially prepared as above described by the action of the relay RCK after checking the bridge and electric circuits and finding them in proper working condition. Closure of another switch RON2 energizes the trip coil RT of the then latched relay LR46 which is thus released to open its switch LR461 in the circuit of the winding 107 of the clutch 108. The springs 106 then engage this clutch and release the associated brake thereby coupling the cam 104 to the tape drum and workpiece in readiness for the next index cycle.

Closure of switch RT1 by energization of the relay RT energizes the relay RR whose switch RR2 is opened to deenergize the relay IUC which in turn opens the switch IUC1 to deenergize the relay RI. The normally closed switch RI2 of the latter is closed and, in combination with the then closed switch RR1 of the relay RR, completes a circuit for energizing the relay IC. Switches IC1 and IC2 are thus closed to complete a circuit energizing the solenoid 128$^a$ for applying the clamps 26 and also prepare the circuit for energizing the relay 139 by which the cutter heads may start in their slotting cycle under the control of the manually operable pushbutton 143. Energization of the relay RON also opens its switch RON1 thus preventing the overtravel lamp 74 from being lighted through the previously closed switch RL42.

With the workpiece thus stopped in the correct position and the clamps 26 applied, the machine is conditioned for cutting the next slots 18$^b$ (Fig. 17). Such movement of the cutter heads may be initiated by manually closing the switch 143. After completion of the cut and retraction of the cutters away from the work, the limit switch 125 is closed so that another indexing cycle may be initiated by manual closure of the start switch 120. The starting operation is the same as previously described except that the starting circuit is through the switch TD453 previously closed in response to the closure of the cam actuated switch LS45. The cycle then proceeds as before except that the various motor control circuits are energized through the switches of the relay TD45 instead of TD46 as previously described.

In this cycle, the motor 19 operates at high speed to turn the workpiece and tape drum counter-clockwise from the previous stopped position (Fig. 19) through somewhat more than a half revolution to bring holes 42$^c$, 84$^c$ into operative association with the sensing head 34. During the half-revolution, the circuits of the sensing heads are held disabled by the open cam switches LS45 and LS46 and, at the end of such half revolution, the cam 104 is uncoupled from the drum with the switch LS46 closed to permit continuance of the advance under the control of the time delay relay TD46 and thereafter under the control of the successively acting holes in the tape.

Closure of the switch LS46 and the consequent closure of the switch TD462 of the relay TD46 closes the circuit to the conductor 133 thereby placing the circuits (Fig. 25$^d$) in active control, these circuits and the relays of the group 134 being associated with the pneumatic bridges B1 and B2 of the left hand sensing head 34. As before, the activation of these circuits occurs at a time when the blank area of the tape just ahead of the hole 42$^c$ is presented to the orifices of the head 34. The operativeness of the latter is thus checked.

With the head 34 now activated, the circuits (Figs. 25$^a$ to 25$^d$) then operate in the same manner as in the preceding cycle to provide the rapid advance, slow down, creeping and finally stopping of the workpiece under the control of the tape holes 42$^c$ and 84$^c$. This part of the cycle is controlled as before but by the alternate set of relays whose reference number is identified by the letter L.

In the event that the mechanism above described does not function properly in stopping the workpiece precisely in the proper position, any resulting overtravel is detected by further expansion of the bellows 60 and the consequent deenergization of the relay RL3. Such unbalancing of the bridge B1 will result from abnormal creeping or coasting of the tape beyond normal stop position shown in Fig. 23 thereby causing a larger area of the orifice 39 to be uncovered by the tape hole 42 than the uncovered area of the orifice 36.

Such overtravel of the tape is shown in Fig. 25 and results in deenergization of the relay RL3 which opens the switch RL32 with the consequent deenergization of the relay RON and of the lamp 72. Closure of the switch RON1 completes a circuit through the switch RL42 to light the red signal lamp 74. Opening of the switch RON5 deenergizes the relay IC thereby opening the switch IC2 in the cutter head control circuit. This prevents the operator from initiating movement of the cutter heads with the workpiece thus positioned incorrectly, the condition indicated by the red light.

This disabled condition of the machine may be corrected in several ways by manually controlling the operation of the motors 19 and 22 through the use of the switches 121, 122 and 123 previously described. The usual procedure would be to reverse the motor 19 and back up the workpiece and drum a distance slightly greater than the slow range b. The switch 121 would then be returned to the automatic position as shown in Fig. 25$^a$ thereby restoring the motors to the automatic control of the same tape holes.

This application discloses subject matter common to and claimed generically in my copending applications Serial No. 654,924, filed April 24, 1957, and Serial No. 682,529, filed September 6, 1957, the claims of this application being subordinate to those of such copending applications.

I claim as my invention:

1. Mechanism for indexing a rotatably mounted support to locate the same in a plurality of different angular positions, having, in combination, a power actuator for turning said support, a drum secured to said support concentric with the axis thereof and having a row of holes formed therein and spaced apart to correspond to the spacing of said support positions, two sensing heads mounted on diametrically opposite sides of said drum in operative association with said holes and each having a pneumatic bridge with orifices spaced longitudinally of said row to be uncovered equally by the leading and trailing edges of one of said holes when said support is in a position corresponding to such hole, said bridge becoming balanced upon such equal uncovering of said orifices, means controlled by said bridge and controlling said actuator to stop said support automatically upon balancing of the bridge of one of said heads, and mechanism operable after such stopping of the support and drum under the control of one of said holes and by one of said heads to operate said actuator and turn said support and drum through more than a half revolution to bring the succeeding hole into operating association with the other of said heads, said mechanism including switches respectively operable to disable said heads, a cam operable in successive half revolutions of said drum to maintain both of said heads disabled and, at the ends of such half revolutions, to select first one and then the other of said heads for controlling said actuator in the next indexing cycle, means automatically coupling said cam to said drum for a half revolution of turning of the latter and then uncoupling the cam, and other means operable after stopping of said cam and during continued turning of said drum to hold the newly selected head disabled until the previously used hole passes such head.

2. Mechanism for indexing a rotatably mounted support to locate the same in a plurality of different angular positions, having, in combination, a power actuator for turning said support, a drum secured to said support concentric with the axis thereof and having a row of holes formed therein and spaced apart to correspond to the spacing of said support positions, two sensing heads mounted on diametrically opposite sides of said drum in operative association with said holes and each having a pneumatic bridge with orifices spaced longitudinally of said row to be uncovered equally by the leading and trailing edges of one of said holes when said support is in a position corresponding to such hole, said bridge becoming balanced upon such equal uncovering of said orifices, means controlled by said bridge and controlling said actuator to stop said support automatically upon balancing of the bridge of one of said heads, and mechanism operable after such stopping of the support and drum under the control of one of said holes and by one of said heads to operate said actuator and turn said support and drum through a predetermined angle of more than a half revolution to bring the succeeding hole into operative association with the other of said heads, and means operable during each of said predetermined turning angles to maintain both of said heads disabled and then activate said other head.

3. Mechanism for indexing a rotatably mounted support to locate the same in a plurality of different angular positions, having, in combination, a power actuator for turning said support, a drum secured to said support concentric with the axis thereof and having a row of holes formed therein and spaced apart therealong to correspond to the spacing of said support positions, two sensing heads mounted on diametrically opposite sides of said drum in operative association with said holes and each having a pneumatic bridge with orifices spaced longitudinally of said row so as to be uncovered equally by the leading and trailing edges of one of said holes when said support is in a position corresponding to such hole, said bridge becoming balanced upon such equal uncovering of said orifices, means controlled by said bridge and controlling said actuator to stop said support automatically upon balancing of the bridge of one of said heads, and mechanism operable after such stopping of the support and drum under the control of one hole and by one of said heads to operate said actuator and turn said support and drum through a predetermined angle of more than a half revolution to bring the succeeding hole into operative association with the other of said heads, and means operable during each of said predetermined turning angles to maintain both of said heads disabled and then activate said other head, said last mentioned means including a cam rotatable with said drum and switches actuated thereby and controlling the disabling and activation of the respective heads.

4. Mechanism for indexing a rotatably mounted support to locate the same in a plurality of different angular positions, having, in combination, a power actuator for turning said support, a drum secured to said support concentric with the axis thereof and having a row of holes formed therein and spaced apart to correspond to the spacing of said support positions, two sensing heads mounted on diametrically opposite sides of said drum in operative association with said holes and each having a pneumatic bridge with orifices spaced longitudinally of said row so as to be uncovered equally by the leading and trailing edges of one of said holes when said support is in a position corresponding to such hole, said bridge becoming balanced upon such equal uncovering of said orifices, means controlled by said bridge and controlling said actuator to stop said support automatically upon balancing of the bridge of one of said heads, and mechanism operable after such stopping of the support and drum under the control of one hole and by one of said heads to operate said actuator and turn said support and drum through a predetermined angle of more than a half revolution to bring the succeeding hole into operative association with the other of said heads, and means operable during each of said predetermined turning angles to maintain both of said heads disabled and then activate said other head, said last mentioned means including a cam rotatable with said drum and switches actuated thereby and controlling the disabling and activation of the respective heads, a clutch operated automatically to couple said cam to said drum to impart said successive half revolutions to the cam, and other means controlling said actuator to continue the turning of said drum for an additional angle less than the spacing of said holes.

5. The combination of, a member mounted for movement along a predetermined path, a power actuator for indexing said member at different speeds through a succession of predetermined positions, a plurality of apertures formed in and spaced along said member and defining pairs of opposed edges with the centers between the edges of the successive pairs spaced along said member in accordance with the spacing of said positions, a feeler head lying adjacent said member and having orifices of equal size spaced along said path to correspond to the spacing of said edges so as to be uncovered equal amounts when any one of said pairs of edges is centered relative to the orifices, said orifices being covered by said member or uncovered unequal amounts by said apertures in other positions of said member, means providing a balanceable pneumatic network including said orifices and balanced either when both of said orifices are covered by solid areas of said member or partially and equally uncovered by exposure to one of said apertures, means for sensing balance and unbalance of said network whereby to indicate the centering of any selected one of said apertures relative to said feeler head, mechanism operated by said sensing means to stop the operation of said actuator when said network becomes balanced by one of said apertures, and a pneumatically actuated feeler for said apertures operable thereby in response to the approach of the associated aperture to within a predetermined distance of one of said index positions to reduce the speed of said actuator during the final advance of said drum to such position.

6. Mechanism for indexing a support to a plurality of positions spaced along a predetermined path, having, in combination, a power actuator for advancing said support at high, slow and creep speeds, a drum secured to said part concentric with the axis thereof and having a row of holes formed therein and spaced apart to correspond to the spacing of said positions, a sensing head contacting said drum and having a pneumatic bridge with orifices that become uncovered equally by the leading and trailing edges of one of said holes when said support is in one of said positions, said bridge becoming balanced upon such equal uncovering, means controlled by said bridge and controlling said actuator to stop said support upon balancing of said bridge, a feeler for said holes including a second pneumatic bridge having two orifices exposed to said drum and spaced apart laterally thereof, other apertures formed in and spaced along said drum and coacting with said feeler to unbalance said second bridge in one direction at one point in the approach of said support to each of said positions and in the opposite directions at a second point closer to but short of such position, and means controlled by said second feeler and controlling actuator to reduce the speed of said support from said high to slow speed at said first point of unbalance and from said slow speed to said creep speed at said second point of unbalance.

7. Mechanism for indexing a support to a plurality of positions spaced along a predetermined path, having, in combination, a power actuator for advancing said support at high, slow and creep speeds, a drum secured to said part concentric with the axis thereof and having a row of holes formed therein and spaced apart to correspond to the spacing of said positions, a sensing head contacting said drum and having a pneumatic bridge with orifices which become uncovered equally by the leading and trailing edges of one of said holes when said support is in one of said positions, said bridge becoming balanced upon such equal uncovering, means controlled by said bridge and controlling said actuator to stop said support upon balancing of said bridge, a pneumatically acting senser having orifices exposed to said drum and spaced apart laterally thereof, other apertures formed in and spaced along said drum and coacting with said senser to determine two spaced points in the approach of said support to each of said positions, and means controlled by said senser and controlling actuator to reduce the speed of said support from said high to slow speed at said first point and from said slow speed to said creep speed at said second point.

8. Mechanism for indexing a support to a plurality of positions spaced along a predetermined path, having, in combination, a power actuator for advancing said support at relatively high and slow speeds, a drum secured to said part concentric with the axis thereof and having a row of holes formed therein and spaced apart to correspond to the spacing of said positions, a sensing head contacting said drum and having a pneumatic bridge with orifices which become uncovered equally by the leading and trailing edges of one of said holes when said support is in one of said positions, said bridge becoming balanced upon such equal uncovering, means controlled by said bridge and controlling said actuator to stop said support upon balancing of said bridge, a feeler for said drum including a second pneumatic bridge having two orifices exposed to said bridge and spaced apart laterally of the drum, other apertures formed in and spaced along said drum and coacting with said feeler to unbalance said second bridge in one direction at one point in the approach of said support to each of said positions, and means controlled by said second feeler and controlling actuator to reduce the speed of said support from high to slow speed at said first point.

9. The combination of, a member mounted for movement along a predetermined path, a plurality of holes formed in and spaced along said member and defining pairs of opposed edges with the centers between the edges of the successive pairs spaced along said member, said member having blank areas between said holes, a feeler head lying adjacent said member and having orifices of equal size spaced along said path to correspond to the spacing of said edges so as to be uncovered equal amounts when any one of said pairs of edges is centered relative to the orifices, said orifices being covered by said member or uncovered unequal amounts by said holes in other positions of said member, means including said orifices providing a balanceable pneumatic network balanced either when both of said orifices are covered by solid areas of said member or partially and equally uncovered by exposure to one of said holes, electrical means for sensing balance and unbalance of said network, and means for checking the operativeness of said network and said electrical means comprising mechanism rendered operative when one of said blank areas is presented to said orifices for sensing a condition of unbalance of said network.

10. The combination of, a member mounted for movement along a predetermined path, a plurality of holes formed in and spaced along said member and defining pairs of opposed edges with the centers between the edges of the successive pairs spaced along said member, the intervening areas of the member being blank, a feeler head lying adjacent said member and having orifices of equal size spaced along said path to correspond to the spacing of said edges so as to be uncovered equal amounts when any one of said pairs of edges is centered relative to the orifices, said orifices being covered by said member or uncovered unequal amounts by said apertures in other positions of said member, means including said orifices providing a balanceable pneumatic network balanced either when both of said orifices are covered by one of said blank areas or partially and equally uncovered by exposure to one of said holes, electrical means for sensing balance and unbalance of said network, checking means for sensing a condition of unbalance of said network, when a blank area is disposed opposite said orifices, and means responsive to the turning of said drum and operable to select the one of said blank areas immediately ahead of the hole next to control said feeler.

11. The combination of, a member mounted for movement along a predetermined path, a plurality of holes formed in and spaced along said member and defining pairs of opposed edges with the centers between the edges of the successive pairs spaced along said member, the intervening areas of the member being blank, a feeler head lying adjacent said member and having orifices of equal size spaced along said path to correspond to the spacing of said edges so as to be uncovered equal amounts when any one of said pairs of edges is centered relative to the orifices, said orifices being covered by said member or uncovered unequal amounts by said apertures in other positions of said member, means including said orifices providing a balanceable pneumatic network balanced either when both of said orifices are covered by one of said blank areas or partially and equally uncovered by exposure to one of said holes, electrical means for sensing balance and unbalance of said network, checking means for sensing a condition of unbalance of said network, when a blank area is disposed opposite said orifices, and means for disabling said feeler except when one of said holes and the blank area immediately in advance of the latter is disposed opposite the feeler and said orifices.

12. The combination of, a member mounted for movement along a predetermined path, a plurality of holes formed in and spaced along said member and defining pairs of opposed edges with the centers between the edges of the successive pairs spaced along said member, a feeler head lying adjacent said member and having orifices of equal size spaced along said path to correspond to the spacing of said edges so as to be uncovered equal amounts when any one of said pairs of edges is centered relative to the orifices, said orifices being covered by said member or uncovered unequal amounts by said holes in other positions of said member, means providing a balanceable pneumatic network including said orifices, said network being balanced when both of said orifices are covered by solid areas of said member or partially and equally uncovered by exposure to one of said apertures, a power operator for indexing said member to present said holes successively to head, mechanism controlled by said head and normally operable in response to balancing of said network by equal uncovering of said orifices to disable said power operator and thereby stop said member in a position in which said orifices are uncovered substantially equally, and means operable upon such stopping for sensing and indicating an unbalanced condition of said network due to overrunning of the member.

13. The combination of, a member mounted for movement along a predetermined path, a plurality of holes formed in and spaced along said member and defining pairs of opposed edges with the centers between the edges of the successive pairs spaced along said member, a feeler head lying adjacent said member and having orifices of equal size spaced along said path to correspond to the spacing of said edges so as to be uncovered equal amounts when any one of said pairs of edges is centered relative to the orifices, said orifices being covered by said member of uncovered unequal amounts by said holes in other positions of said member, means providing a balanceable pneumatic network including said orifices, said network being balanced when both of said orifices are covered by solid areas of said member or partially and equally uncovered by exposure to one of said apertures, a power operator for indexing said member to present said holes successively to head, mechanism controlled by said head and normally operable in response to balancing of said network by equal uncovering of said orifices to disable said power operator and thereby stop said member in a position in which said orifices are uncovered substantially equally, and means responsive to the condition of balance of said network and operable after stopping of said member beyond said position to the erroneous positioning of the member.

References Cited in the file of this patent

UNITED STATES PATENTS

| | | |
|---|---|---|
| 2,254,098 | Ziebolz | Aug. 26, 1941 |
| 2,380,357 | Ziebolz | July 10, 1945 |
| 2,486,097 | Barnes | Oct. 25, 1949 |